March 17, 1964 T. F. ANDERSON 3,125,476

METHOD OF EXTRACTING GLASS FIBERS

Filed May 26, 1961 3 Sheets-Sheet 1

INVENTOR
THOMAS F. ANDERSON

BY Cushman, Darby & Cushman
ATTORNEYS

METHOD OF EXTRACTING GLASS FIBERS
Filed May 26, 1961
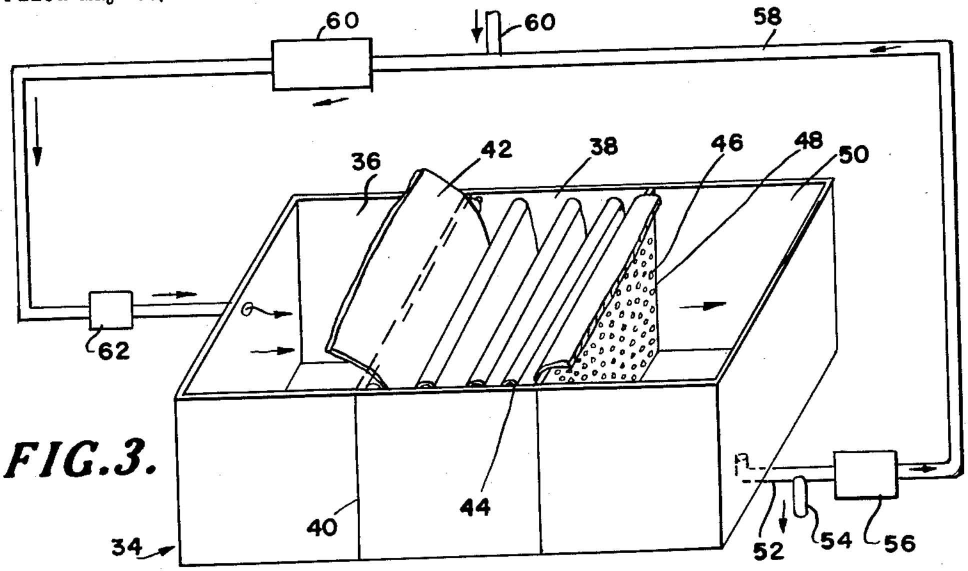
FIG.3.
FIG.4.
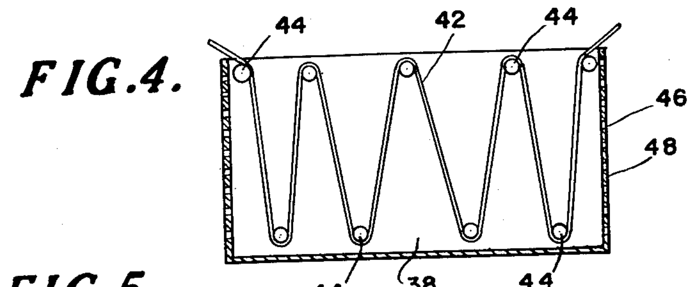
FIG.5.
FIG.6.
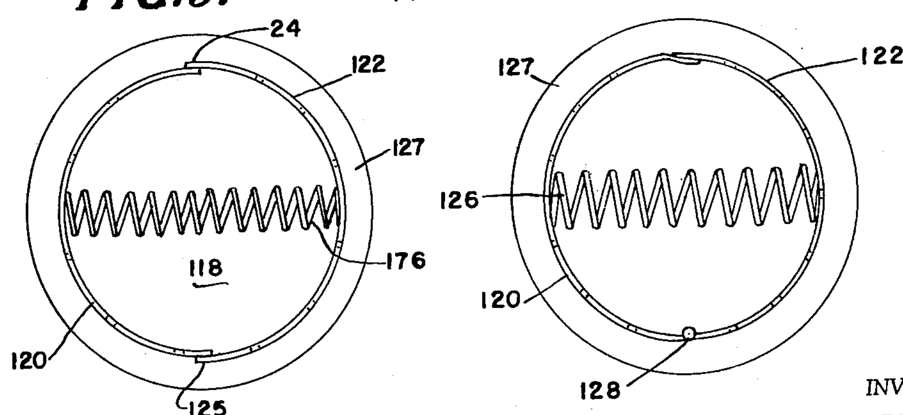
INVENTOR
THOMAS F. ANDERSON
BY Cushman, Darby & Cushman
ATTORNEYS

METHOD OF EXTRACTING GLASS FIBERS

Filed May 26, 1961 3 Sheets-Sheet 3

INVENTOR
THOMAS F. ANDERSON

BY Cushman, Darby & Cushman
ATTORNEYS

United States Patent Office 3,125,476

Patented Mar. 17, 1964

1

3,125,476

METHOD OF EXTRACTING GLASS FIBERS

Thomas F. Anderson, Wilmington, Del., assignor to Haveg Industries, Inc., Wilmington, Del., a corporation of Delaware Filed May 26, 1961, Ser. No. 112,869

3 Claims. (Cl. 156—24)

This invention relates to a method of acid extracting glass fibers.

It has previously been proposed to acid extract glass fibers, e.g., Parker Patent 2,686,954, Nordberg Patent 2,461,841, and Moore application Serial No. 814,850, filed May 21, 1959, now Patent 2,995,803.

Difficulties are encountered in such processes in obtaining product uniformity. Additionally, there has been no practical way to acid extract glass fibers on a commercial basis except in the form of cloth.

Accordingly, it is an object of the present invention to prepare acid extracted glass fibers having a greater product uniformity.

Another object is to acid extract glass fibers in forms other than cloth, e.g., rovings, tie-chord cordage, yarn, etc.

A further object is to reduce the reaction time for the acid treatment.

An additional object is to produce a higher yield of leached product per unit of leaching space.

Yet another object is to permit rapid change in the process fluid.

A still further object is to provide greater versatility in the selection of the form of the glass fibers to be extracted.

Another object is to prevent weakening or rupture of glass fiber material as a result of the shrinkage which occurs due to the acid extraction.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by extracting glass fibers by continuous forced flow extraction. Instead of soaking the glass fibers in acid, the acid fluid, in either liquid or gaseous form is forced through the fibers. In similar manner the wash fluid is forced through the acid extracted fibers. The acid fluid comes in contact with and digests the glass fibers, either in the form of woven cloth, unwoven cloth, rovings, cordage, bulk fibers, yarn, or the like.

The invention will be best understood in connection with the drawings wherein:

FIGURE 2 is a view of a portion of the surface of the perforated mandrel of FIGURE 1;

FIGURE 3 is a schematic view of a different form of the invention;

FIGURE 4 is a detailed view of the acid extraction bath of FIGURE 3;

FIGURE 5 shows a preferred modification of the mandrel of FIGURE 1;

FIGURE 6 shows an alternative preferred modification of the mandrel;

2

Figure 9:
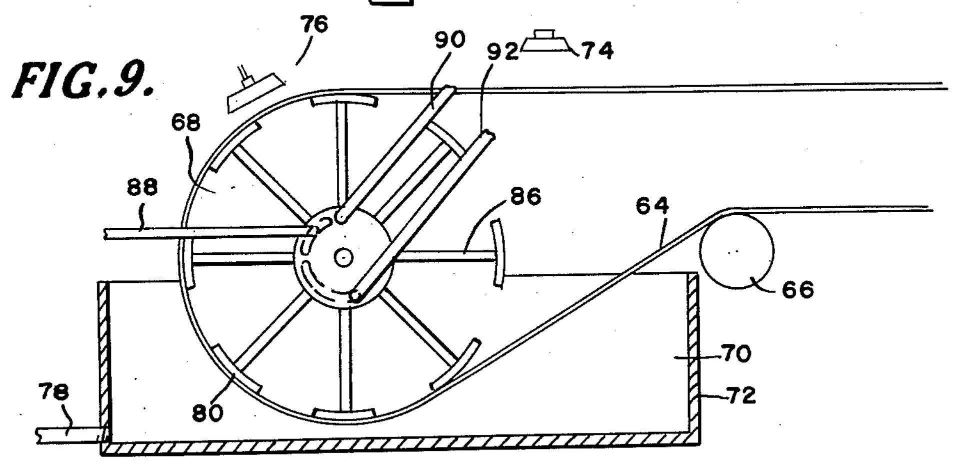
Figure 10:
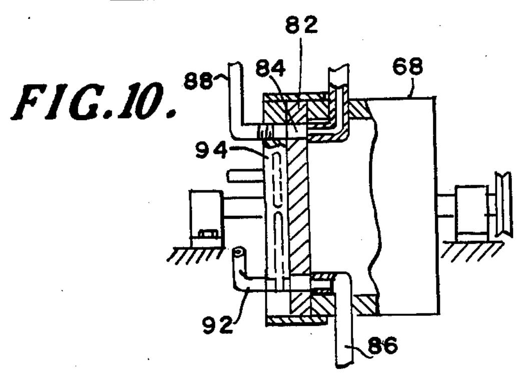

FIGURE 9 shows a rotating drum arrangement which can be used according to the invention; and FIGURE 10 is a view partially in section showing the pipe fittings in FIGURE 9.

Figure 1:
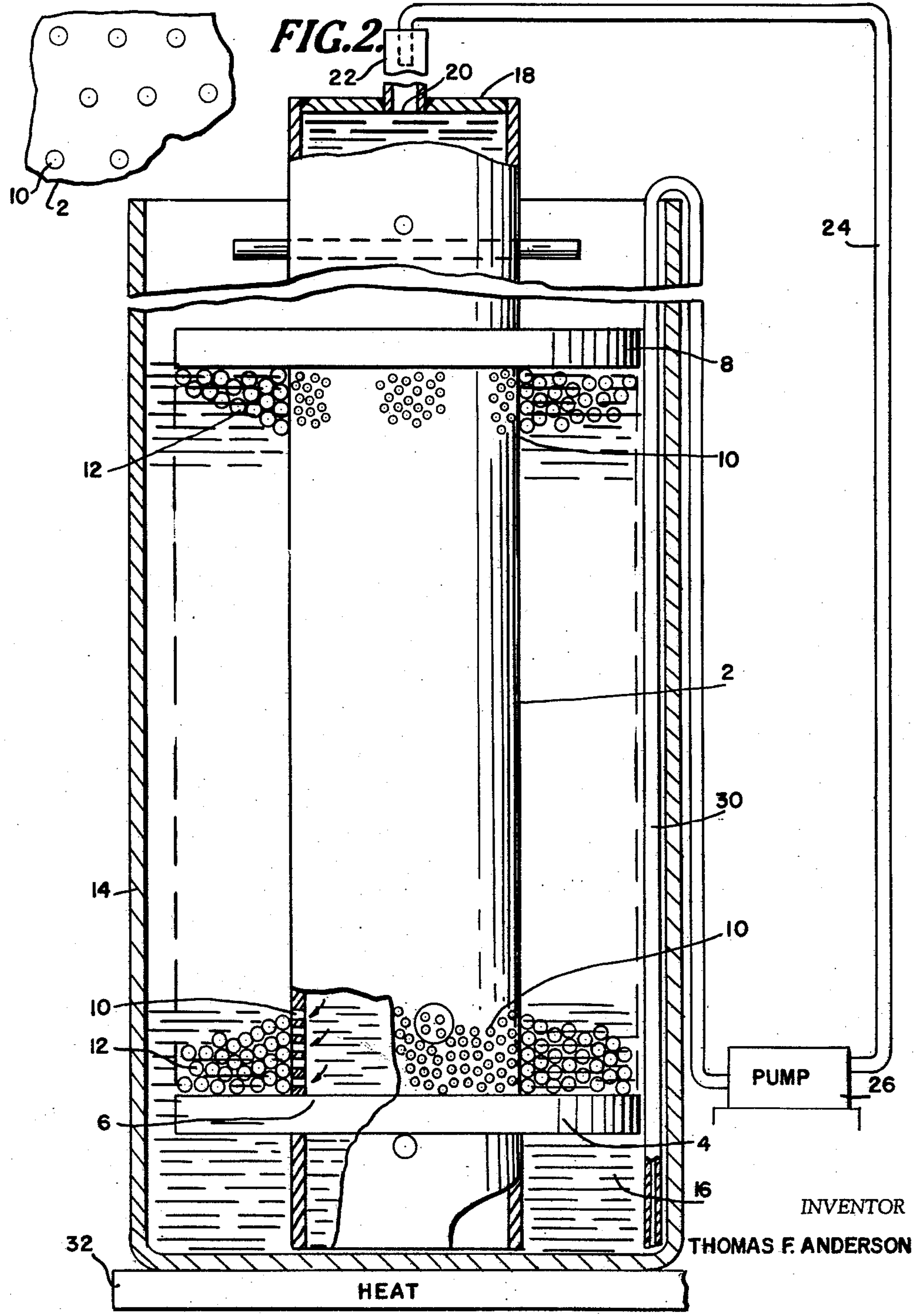
FIGURE 1 is a vertical elevation partially in section showing a preferred form of suitable apparatus.

In the form of the invention shown in FIGURES 1 and 2 undigested glass fibers in the form of woven or unwoven cloth, rovings, cordage, bulk fibers or yarn is wrapped around a perforated hollow cylindrical mandrel. Acid is permitted to enter the hollow portion of the mandrel and is forced through the perforations and then comes in contact with and digests the glass fibers. The acid can either be in liquid form, e.g. aqueous hydrochloric acid, hydrobromic acid, or in gaseous form, e.g. gaseous hyrdogen chloride or hydrogen bromide. The acid can either pass from the center of the mandrel to the outside container or the reverse order of flow can be used.

As shown in FIGURES 3 and 4 there is employed a compartmental box type arrangement having three compartments. The center compartment contains the material to be extracted, be it glass cloth, loose fibers, rovings, yarn or otherwise. The extracting fluid, e.g. aqueous hydrochloric acid or gaseous hydrogen chloride, is forced from one of the outer compartments through openings (holes, a screen or the like) in the dividing wall through the material and collected in the remaining outer compartment for storage, recirculation or otherwise. More than three compartments can be employed. Thus, a washing can be carried out in a fourth compartment.

The acid extraction of the glass fibers has been found to cause shrinkage of the material. This results in a tightening and weakening or rupture of the material. This is especially troublesome in the areas nearest the mandrel. To overcome this difficulty a spring-loaded collapsible mandrel is preferably employed as shown in FIGURES 5 and 6.

Figure 7:
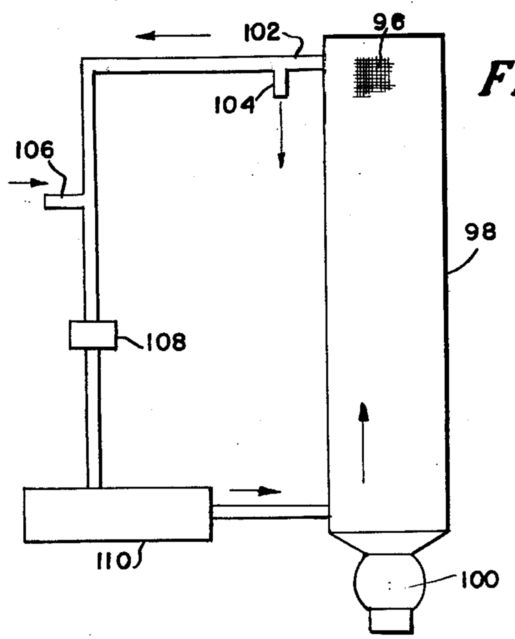
FIGURE 7 is a schematic view of another form of the invention.

FIGURE 7 illustrates a procedure wherein the glass fibers, e.g. as loose fibers, chopped woven material or the like is passed downward through a tower as the fluid, e.g. aqueous hydrochloric acid or gaseous hydrogen chloride, is forced upward. The direction of flow of the glass fibers and the extracting acid can be reversed.

Figure 8:
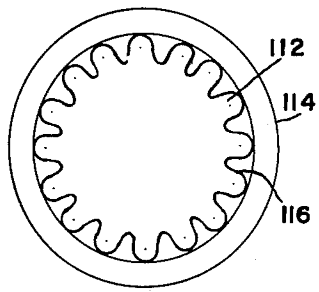
FIGURE 8 is a top view of still another form of mandrel.

FIGURE 8 illustrates a form of the invention in which the glass fibers are wrapped around a solid fluted mandrel. The direction of the fluid flow can be varied. As one example the fluid (aqueous hydrochloric acid or gaseous hydrogen chloride) can be introduced into the flutes and pass out through the glass fibers in the form of cloth, collected, in a container in which the mandrel is placed, recirculated through a heat-exchanger, make up acid added to give the proper acid concentration, and then back again into the flutes. In an alternative embodiment of the invention the acid fluid can pass from the periphery of the material, through the material in toward the mandrel, pass in and through and out of the flutes to a heat-exchanger and then recirculated. The mandrel would be kept in a suitable containing vessel.

In a third form the fluted mandrel can be hollow, perforated or unperforated and made from a flexible type material, e.g. polyethylene, polypropylene, polytetrafluoroethylene, polychlorotrifluoroethylene or the like. Thus when the shrinkage forces of the glass fibers in cloth or other form come into play, the flutes or pleats come together to a degree or close completely in somewhat of an accordian type effect. When the material to be extracted is wrapped around this flexible type of mandrel a temporary reinforcing liner is placed inside and is then removed before the acid etching.

In the case of the unperforated hollow flexible fluted mandrel the fluid flow can follow the pattern shown for the solid fluted mandrel, i.e. the fluid can pass in either direction through the flutes. In the case of the perforated hollow flexible fluted mandrel the fluid can be originated either internally from the mandrel flowing out through the glass cloth, yarn, etc. or externally flowing through the cloth or yarn into the mandrel. The primary purpose of the hollow flexible mandrels is to prevent rupturing or weakening of the material on shrinkage.

FIGURES 9 and 10 show an assembly where the glass fibers are fed on a rotating drum which is partially immersed in extracting fluid, e.g. aqueous hydrochloric acid. As the drum rotates it places the unextracted material in the extracting liquid. This material is subsequently withdrawn as the drum continues rotation. Internal suction in the drum can also be employed to assist in the penetration and removal of the fluid (and wash water if such is used) from the material. This assembly is basically like an Oliver type filter as shown in Badger and McCabe "Elements of Chemical Engineering" (1936), pages 484–487. The Oliver filter is described in detail in Perry's "Chemical Engineers Handbook," second edition, pages 1673–1676.

Referring more specifically to the drawings, as shown in FIGURE 1 there is provided a hollow cylindrical mandrel 2 made of acid-resistant material such as asbestos filled phenol-formaldehyde or porcelain or certain metal alloys, for example Hastelloy. Near the lower end of the mandrel there is provided a circular external flange 4. The mandrel 2 is closed internally by a plug 6 positioned for convenience at the same place as the flange 4. Near the upper end of the mandrel there is provided a second circular external slip flange 8. The surface of the mandrel between the two flanges is provided with a multitude of perforations or apertures 10. Glass fibers 12 are wrapped around the outside of the mandrel 2 between flanges 4 and 8. There is also provided an acid-resistant tank 14 filled with acid 16, e.g., aqueous hydrochloric acid. The mandrel 2 with the glass fibers 12 wrapped therearound is then positioned in the acid filled tank. The upper end of the mandrel is closed by an acid-resistant plug 18 having an opening 20 therein. An acid-resistant pipe 22 is fitted into the opening. The pipe in turn is connected to an acid-resistant tube 24 which is connected to a pump 26. A siphon 30 extends into the acid solution 16 and at its other end is connected to the pump 26. In operation, acid is withdrawn from the solution 16 through the siphon 30 and is pumped back through tube 24 and pipe 22 to the interior of the mandrel 2. It then passes through apertures 10 and inbetween the glass fibers, acid extracting them in the process.

The acid extraction tank 14 is heated by any convenient source of heat 32. Alternatively an external heat-exchanger can be used for heating the acid.

In continuous operation a portion of the acid withdrawn through the siphon is removed from the system as spent acid and replaced by fresh acid of proper concentration. The silicates and other materials extracted from the glass fibers are recovered from the spent acid and the spent acid, after appropriate reconcentration, can then be readded to the system.

After the glass fibers have been extracted sufficiently, the acid is withdrawn from the system and replaced by tap water. The tap water is not recirculated but is continuously replaced until all of the acid clinging to the glass fibers has been removed.

In one installation the mandrel was of 4 inch diameter, 6 feet long, had ⅛ inch holes ½ inch on centers, the flanges were 24 inches in diameter and there were 38 inches between the two flanges. The pipe 22 was 2 inches in diameter.

*Example*

A spool or mandrel was made from a 2 inch internal diameter acid-resistant pipe. An external flange was attached at the lower end thereof and a tight fitting internal plug was also positioned at this point in the spool.

Holes were drilled in the mandrel ⅛ inch in diameter and ½ inch on center beginning at the external flange (and internal plug) and continuing upward for 6 inches. Another flange was cut so it could be slipped over the open end of the pipe. No. 1584 glass cloth was folded in 6 layers 6 inches wide and wrapped around the pipe where the holes were drilled and then wired in place with Teflon (polytetrafluoroethylene) coated wire. The total thickness of the cloth around the pipe was about 1¾ inches which amounted to about 70 individual layers. Then the slip flange was put on top of the wrappings.

The roll of cloth was put in a 9½ inch internal diameter by 18 inch high Pyrex jar into which had been placed 9000 cc. of 13% HCl at 173° F. The acid was drawn off of the bottom of the jar by siphoning it into 1000 cc. beakers and recirculated by pouring it into the top of the acid-resistant pipe which had a total length of 22 inches. The circulation rate was maintained at 7500 cc. every 4 minutes for the first hour, 2800 cc. every 4 minutes for the next hour and a half and at 7500 cc. for the next ¾ hour. The temperature was maintained at 156–190° F. during this ¾ hour period.

The cloth was then washed with tap water for 1¾ hour by pouring water into the top of the acid-resistant pipe and throwing the wash water away after one pass.

A product having very good uniformity was recovered. As has been indicated, in place of glass cloth the present process works well with rovings, cordage, yarns, etc.

The conditions of acid extraction employed in the above example can also be used with the apparatus of FIGURES 3–10 of the drawings.

The acid etching conditions preferably are those set forth in the Moore application. Thus, etching is preferably done at a temperature of 150° F. The temperature should be below the boiling point, e.g., ½° F. or below. By using superatomspheric pressure, temperatures as high as 230° F. or above can be employed. The hydrochloric acid can be of 5 to 30% concentration by weight, preferably being 10–15%.

By use of shorter acid digestion times and higher temperatures, e.g., 180° F. and particularly 190° F. and above, the best results are obtained.

There can be employed glass fibers of various sizes, e.g., size E fibers and size G fibers.

While aqueous hydrochloric acid is the preferred leaching acid, there can be employed other acids such as nitric acid, trichloroacetic acid, sulfuric acid, acetic acid, hydrobromic acid, etc. Also there can be employed acidic gases as previously indicated.

The acid extraction is preferably continued until the sodium carbonate soluble silica is at least 90% and most preferably 92–95%, acid extraction can continue until the sodium carbonate soluble silica is as much as 99%. However, acid extraction can be stopped at a lower point, e.g. at 70% sodium carbonate soluble silica as set forth in Parker Patent 2,624,658.

In the example approximately 20% of the surface area of the mandrel between the flanges was in the apertures. This can be varied, e.g., from 10 to 50% of the surface area.

While the example shows passing the acid from the center of the mandrel through the fibers to the outside container, the reverse order of flow can be used.

As shown in FIGURES 3 and 4 in place of a mandrel there can be employed a compartmental box arrangement 34. Extracting fluid, e.g. 13% aqueous hydrochloric acid enters outer compartment 36, is forced through openings in the dividing wall between this compartment and inner compartment 38. The dividing wall is indicated at 40. Glass fibers, e.g. in the form of cloth 42 pass through the inner compartment 38. The fibers pass continuously over and under rollers 44 as indicated in FIGURE 4. The extracting fluid passes through the glass fiber material in compartment 38 and through apertures 46 in dividing wall 48 into outer compartment 50.

The glass cloth after emerging from compartment 38 does not go into compartment 50 but instead can be dried and wound into a roll. More preferably before drying the glass cloth is passed into another compartment (not shown) and wash water forced through the cloth to remove any adhering acid. In place of glass cloth there can be employed glass fibers in bulk form and such is preferred in this embodiment. In the case of bulk fibers the process is operated batchwise.

The spent acid is removed from compartment 50 through pipe 52. A portion of the spent acid is bled off through line 54. The remaining spent acid is recirculated through pump 56 and pipe 58 to compartment 36. Fresh acid is added through line 60 to return the acid to its initial strength, e.g., to restore the acid to 13% aqueous hydrochloric acid. The acid then passes through external heat-exchanger 60 to restore the temperature, e.g. to 185° F. An additional pump 62 can be placed in pipe 58 as indicated if desired.

While the assembly is indicated as being positioned in horizontal alignment, it can also be positioned vertically for a dripolater effect.

A cover is preferably supplied for the compartments.

As shown in FIGURES 9 and 10 there can be employed an assembly which is essentially an Oliver filter. Glass fiber 64, either as a single layer, or multilayer, is fed from roll 66 onto a rotating drum 68. The drum is partially immersed in extracting fluid 70, e.g. 13% aqueous hydrochloric acid, in tank 72. The glass fibers are subsequently withdrawn from the fluid as the drum continues its rotation. After the fibers leave the drum they can be dried, e.g. with the aid of drying lamps 74. Optionally, additional acid spray or wash water can be sprayed on the fibers from spray 76. The extracting acid comes from a heat-exchanger (not shown) through pipe 78, is passed through the fibers and screens 80 on the drum 68. On one side of the drum there is provided a valve seat 82 which rotates with the drum. As the drum rotates the holes 84 in the valve seat to which are attached the pipes 86 communicating with the various sections of the drum come successively under the wash water outlet 88, acid outlet 90 and air outlet 92 in stationary plate 94 which fits over the valve seat.

The wash water outlet, acid outlet, etc. are in turn connected to receivers (not shown) which in turn are connected to a vacuum pump (not shown). The use of vacuum aids in the penetration of the acid fluid as well as the wash water when the latter is employed.

Another alternative arrangement is shown in FIGURE 7. Loose glass fibers (or woven material) 96 is passed downward through a tower 98 as acid fluid (e.g. 12% aqueous hydrochloric acid) is forced countercurrently upward. The glass fibers after passing through the acid are removed at the bottom of the tower by means of a rotary pocket feeder 100 (or a star) which serves as a lock to prevent acid being removed with the solids. Acid is removed from the top of the tower 98 through line 102. Spent acid is withdrawn through pipe 104 and make up acid added through pipe 106. The acid is forced along with the aid of pump 108 and is heated to the proper temperature by passing through heat-exchanger 110 prior to entering the bottom of the tower.

In FIGURE 8 there is shown a solid fluted mandrel 112 which can be employed in place of the mandrel 2 shown in FIGURES 1 and 2. The glass fibers 114, which can be multilayered are wrapped around the mandrel. The direction of the fluid flow is optional. Thus, the fluid can be introduced into the flutes and pass out through the cloth and collected in a container in which the mandrel is placed and recirculated as shown in FIGURE 1 for example.

In a different embodiment the fluid can pass from the periphery of the glass fibers, through the fibers in toward the mandrel, pass in and through and out of the flutes and recirculated as shown in FIGURE 1.

In place of being solid the fluted mandrel of FIGURE 8 could be flexible, hollow and either perforated (similar to the mandrel of FIGURE 1) or unperforated. In the case of the unperforated hollow flexible mandrel, the direction of fluid flow would be the same as when employing a solid fluted mandrel. When utilizing the perforated hollow flexible mandrel the fluid flow can be the same as with the mandrel shown in FIGURE 1, i.e. the fluid flow can originate either internally or externally of the mandrel.

The perforated mandrel of FIGURE 1 can be made collapsible as shown in FIGURES 5 and 6 to prevent tightening and weakening or rupture of the glass fiber material. Thus, as shown in FIGURE 5, the perforated mandrel 118 has a smaller half 120 and a larger half 122 which overrides the smaller half at 124 and 125. There is also provided an internal spring 126 which permits the mandrel to reduce in diameter as the acid extracted glass cloth 127 shrinks. The fluid can flow in either direction through the mandrel in the manner previously set forth. The collapsible mandrel in FIGURE 6 is similar to that in FIGURE 5 except that a hinge 128 is provided so that the mandrel can be opened.

I claim:

1. A method of extracting glass cloth comprising wrapping the glass cloth in a plurality of layers around a hollow foraminous roll, wherein said roll has uniformly distributed perforations throughout, said perforations covering 10 to 50% of the surface area of the roll, forcefully passing leaching acid through the perforations in said hollow roll and thence through the glass cloth, while exhausting the overflow of said acid so as to establish a continuous flow of acid through the system.

2. A process according to claim 1 wherein the acid is aqueous hydrochloric acid.

3. A process according to claim 1 wherein a portion of the spent acid after passing through the glass cloth is removed from the system and replaced by fresh acid.

References Cited in the file of this patent

UNITED STATES PATENTS

| | | |
|---|---|---|
| 2,686,954 | Parker | Aug. 24, 1954 |
| 3,012,930 | Labino | Dec. 12, 1961 |

FOREIGN PATENTS

| | | |
|---|---|---|
| 769,375 | Great Britain | Mar. 6, 1957 |
| 821,362 | Great Britain | Oct. 7, 1959 |